(12) United States Patent
Boehl et al.

(10) Patent No.: US 7,567,630 B2
(45) Date of Patent: Jul. 28, 2009

(54) DATA PROCESSING DEVICE INCLUDING CLOCK RECOVERY FROM VARIOUS SOURCES

(75) Inventors: Eberhard Boehl, Reutlingen (DE); Reiner Schnitzer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 678 days.

(21) Appl. No.: 11/229,102

(22) Filed: Sep. 16, 2005

(65) Prior Publication Data

US 2006/0067449 A1 Mar. 30, 2006

(30) Foreign Application Priority Data

Sep. 16, 2004 (DE) .................. 10 2004 044 815

(51) Int. Cl.
*H04L 27/00* (2006.01)
(52) U.S. Cl. ..................................... 375/326; 375/354
(58) Field of Classification Search ................ 375/326, 375/354, 373, 376
See application file for complete search history.

(56) References Cited

U.S. PATENT DOCUMENTS

| | | | |
|---|---|---|---|
| 4,349,914 A | 9/1982 | Evans | |
| 4,827,490 A | 5/1989 | Guérin | |
| 4,876,700 A * | 10/1989 | Grindahl | 375/333 |
| 5,577,196 A | 11/1996 | Peer | |
| 5,692,022 A | 11/1997 | Haulin et al. | |
| 6,028,903 A * | 2/2000 | Drost et al. | 375/360 |
| 6,178,212 B1 | 1/2001 | Akashi | |
| 2008/0133164 A1* | 6/2008 | Cranford et al. | 702/117 |

FOREIGN PATENT DOCUMENTS

EP 1365543 11/2003

* cited by examiner

*Primary Examiner*—Emmanuel Bayard
(74) *Attorney, Agent, or Firm*—Kenyon & Kenyon LLP

(57) ABSTRACT

A data processing device is described having a first receive data input unit for inputting a first receive data stream into the data processing device, at least one second receive data input unit for inputting at least one second receive data stream and a clock recovery unit for recovering a clock signal from the first receive data stream and/or the at least one second receive data stream. A control device controls the clock recovery unit as a function of either the first receive data stream or of one of the at least one second receive data streams and a delay unit delays the at least one second receive data stream with respect to the first receive data stream in such a way that the first receive data stream is synchronized with the at least one second receive data stream.

18 Claims, 3 Drawing Sheets

DATA PROCESSING DEVICE INCLUDING CLOCK RECOVERY FROM VARIOUS SOURCES

FIELD OF THE INVENTION

The present invention relates to a data processing device which is designed to recover a clock signal from various sources. In particular, the present invention relates to a data processing device including a clock recovery unit based on a phase locked loop (PLL), which obtains information from a first receive data stream and at least one second receive data stream, it being possible to switch between both receive data streams as needed. Specifically, the present invention relates to a data processing device including a first receive data input unit for inputting a first receive data stream into the data processing device, at least one second receive data input unit for inputting at least one second receive data stream into the data processing device, and a clock recovery unit for recovering a clock signal from the first receive data stream and/or the at least one second receive data stream.

BACKGROUND INFORMATION

Clock recovery units are normally connected to a data source and recover a clock rate characteristic of the data source. Normally such clock recovery units are operated using phase locked loops (PLL).

In doing so, the clock rate via which the data streams in question are sent is recovered. Duplicate networks are used in safety-critical applications. For safety reasons, different clock recovery units are used for such duplicate networks. Data is then transmitted using two separate systems which exchange their data.

Data processing systems which process a plurality of data streams may be driven by the same clock signal. Since a common clock signal then processes the at least two data streams and since this clock signal is recovered from the data streams using a clock recovery unit having a phase locked loop, it is necessary for the clock signal to be available or recoverable if one of the at least two data streams is lost due to an error in the data system.

In order to solve this problem, conventional data processing systems use switching devices which ensure that a clock recovery is shifted to the at least one second data stream by the clock recovery unit if one data stream is lost. In a disadvantageous manner, however, a phase shift generally exists between the first data stream and the at least one data stream in such a way that a settling time is necessary if the clock recovery unit recovers and synchronizes a clock signal from another data stream. Such settling times may be in the order of magnitude of 10 to 20 milliseconds (ms); such a settling time is not tolerable for safety-critical applications.

For safety reasons, clock recovery units of this type are not usable for x-by-wire systems in particular.

SUMMARY OF THE INVENTION

It is therefore an object of the present invention to develop a data processing device which is synchronizable to various data streams with low settling times.

One aspect of the present invention is to compensate a phase shift existing between various data streams which are received by the data processing device before it becomes necessary to switch over the clock recovery unit provided in the data processing device.

Another aspect of the present invention is to determine a delay signal representing a time delay between a first receive data stream and at least one second receive data stream in advance, i.e., before a loss of one of the two data streams, and to store it in a memory unit.

The advantage thus exists that if one of the two receive data streams is lost, a clock recovery may be switched over between the data streams, the settling time being negligible. According to a general aspect, the data processing device of the present invention for processing at least two data streams essentially includes:

a) a first receive data input unit for inputting a first receive data stream into the data processing device;

b) at least one second receive data input unit for inputting at least one second receive data stream into the data processing device; and c) a clock recovery unit for recovering a clock signal from the first receive data stream and/or the at least one second receive data stream, a control unit for controlling the clock recovery unit as a function of either the first receive data stream or one of the at least one second receive data streams, and a delay unit for delaying the at least one second receive data stream with respect to the first receive data stream being provided in such a way that the first receive data stream is synchronized with the at least one second receive data stream.

Furthermore, the method of the present invention for processing data and for clock recovery in a data processing device has essentially the following steps:

a) inputting a first receive data stream into the data processing device using a first receive data input unit;

b) inputting at least one second receive data stream into the data processing device using at least one second receive data input unit; and c) recovering a clock signal from the first receive data stream and/or the at least one second receive data stream using a clock recovery unit, the clock recovery unit being controlled as a function of either the first receive data stream or one of the at least one second receive data streams using a control unit and the at least one second receive data stream being delayed with respect to the first receive data stream by a delay unit in such a way that the first receive data stream is synchronized with the at least one second receive data stream.

According to a preferred refinement of the present invention, the clock recovery unit includes a phase locked loop (PLL) which synchronizes a recovered clock signal to the clock rate of one of the data streams supplied to the data processing device.

Another aspect of the present invention is directed to a determination unit for determining a time shift between the first receive data stream and the at least one second receive data stream. The determination of a time shift advantageously delivers a delay signal which may be used to delay one of the receive data streams supplied in such a way that the data streams supplied to the data processing device are synchronized. The clock recovery unit is thus advantageously able to rapidly make use of synchronization between different receive data streams.

Advantageously, the memory unit is provided for storing at least one delay value, the at least one second receive data stream being delayed according to the delay value.

Yet another aspect of the present invention is directed to a calibration switching unit which is used to switch from a normal mode, in which the clock signal is recovered from the first receive data stream or the at least one second receive data stream, into a calibration mode, in which a delay value for the at least one second receive data stream is determined using the determination unit.

It is advantageous to design the delay unit for providing a variable delay of the at least one second receive data stream with respect to the first receive data stream from inverter units connected in series. Preferably, the number of inverter units connected in series is variable in such a way that it is possible to set a variable delay using the delay unit. The magnitude of the variable delay is advantageously set as a function of the delay value stored in the memory unit.

According to yet another preferred refinement of the present invention, a generated clock signal which is obtained using the clock recovery unit is synchronized alternatingly with the first receive data stream and the at least one second receive data stream.

Furthermore, it is advantageous that a first transmit data stream is provided at a first transmit data output unit of the data processing device as a function of the first receive data stream. In a similar manner, a second transmit data stream is provided at a second transmit data output unit of the data processing device as a function of the second receive data stream.

Advantageously, the second receive data stream and the second transmit data stream may be provided a plurality of times.

It is advantageous if the first receive data stream is used as a reference data stream for the at least one second receive data stream. In the calibration mode, the received second receive data stream is forwarded unchanged to a second output unit of the data processing device for output as a second transmit data stream.

It is thus possible for the data processing device of the present invention to provide a switchover between a first receive data stream and at least one second receive data stream quickly and efficiently in such a way that if the clock signal is recovered using a clock recovery unit, there are no settling times or time delays which might prevent data processing in the data processing device due to an imprecisely synchronized clock signal.

BRIEF DESCRIPTION OF THE DRAWINGS

Identical reference numerals in the figures denote components or steps that are identical or have an identical function.

DETAILED DESCRIPTION

Figure 1:
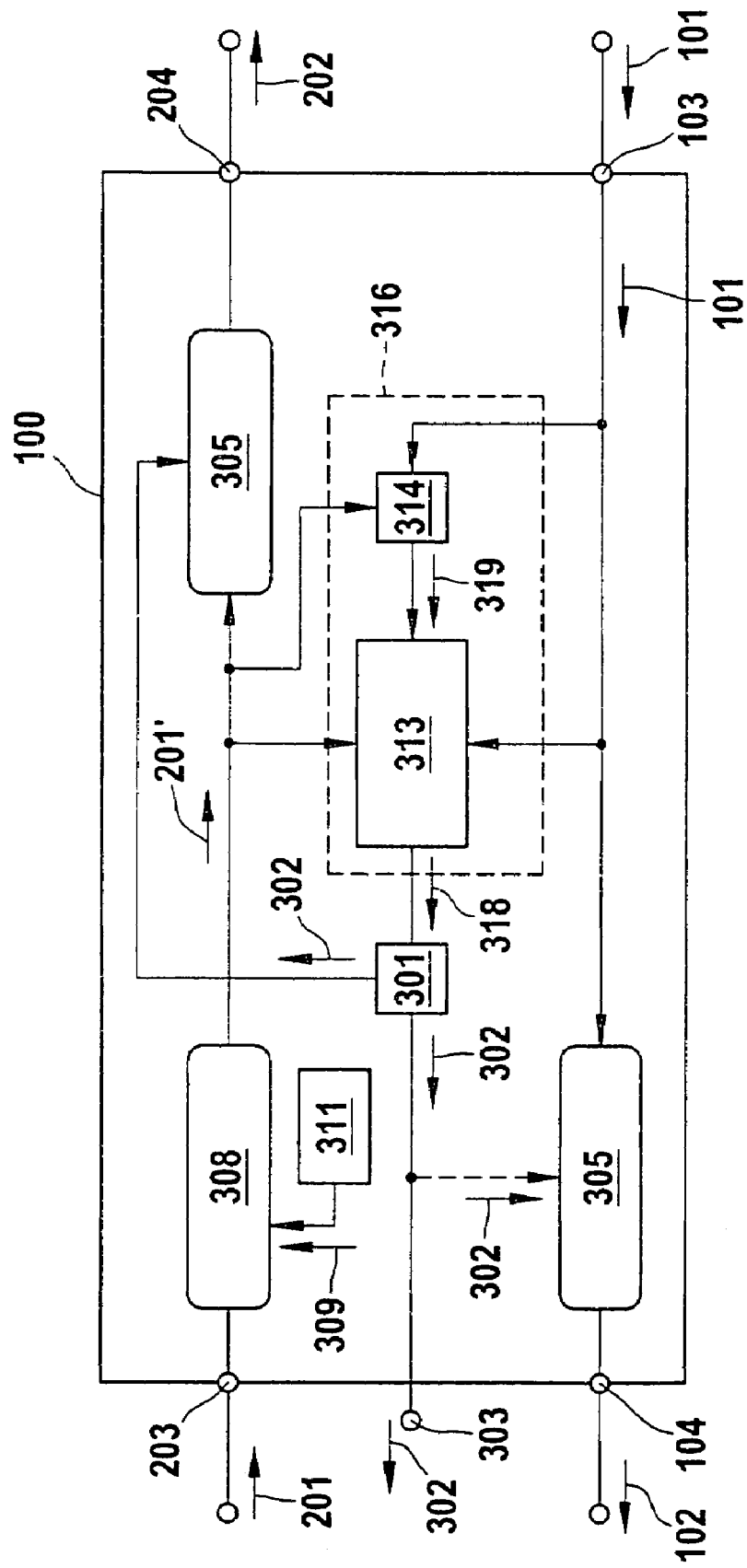
FIG. 1 shows an overall block diagram of the data processing device according to the present invention for illustrating the principles of the present invention.

FIG. 1 shows an overall block diagram of a data processing device according to a preferred exemplary embodiment of the present invention. As shown in FIG. 1, data processing device 100 receives a first receive data stream 101 which is supplied to a first receive data input unit 103 of data processing device 100. At least one second receive data stream 201 is supplied to a second receive data input unit 203 of data processing device 100. It should be pointed out that although it is not illustrated in FIG. 1, it is possible to supply a plurality of receive data streams. Generally, at least one receive data stream 101 and at least one second receive data stream 201 are supplied to data processing device 100. In the example illustrated in FIG. 1, first receive data stream 101 is used as a reference data stream for second receive data stream 201. In order to be able to connect a plurality of (at least two) data processing devices 100 in series in a data processing system, the first and second receive data streams 101, 201 must also be capable of being output as first and second transmit data streams 102 and 202, respectively.

To this end, a first transmit data output unit 104 is provided in the data processing device for outputting first transmit data stream 102, while a second transmit data output unit 204 is provided for outputting second transmit data stream 202.

First receive data stream 101 is supplied to a synchronization unit 305 which, as a function of a supplied clock signal 302, ensures that first receive data stream 101 is supplied to first transmit data output unit 104 as first transmit data stream 102 according to supplied clock signal 302.

In a similar manner, second receive data stream (at least one second receive data stream 201 is present) 201 is supplied to a synchronization unit 305, from which second transmit data stream 202 is output via second transmit data output unit 204. Furthermore, a delay unit 308 is connected in the signal path of second transmit data stream 201, the delay unit being designed to delay second receive data stream 201 by a predetermined amount, i.e., by a delay value 309 supplied to delay unit 308. Delay value 309 is stored in a memory unit 311 and is read out from it as needed. How such a delay value 309 is determined and stored in memory unit 311 is explained in the following with reference to FIG. 2.

Clock signals 302 are supplied to the various units from a clock recovery unit 301. Accordingly, clock signal 302 is supplied to the particular synchronization units 305 that are situated in the signal path of first receive data stream 101 and second receive data stream 201. Furthermore, clock signal 302 may be output via a clock signal output 303 to units outside of data processing device 100.

A control signal 318 which is output by a control unit 316 controls clock recovery unit 301. This means that control signal 318 effects synchronization to one of the two receive data streams 101 or 201.

Control unit 316 has a changeover unit 313 and an activity detection unit 314. The two receive data streams 101 and 201, respectively, are supplied to both activity detection unit 314 and changeover unit 313. In a normal mode, which is described in the following with reference to FIG. 3, changeover unit 313 of control unit 316 makes it possible to determine to which receive data stream, i.e., first receive data stream 101 or second receive data stream 201, clock signal 302 to be recovered is synchronized. In a normal operating mode, clock recovery unit 301 is first synchronized to first receive data stream 101. In doing so, activity detection unit 314 detects an activity in first receive data stream 101 and in delayed second receive data stream 201'.

If one of the two receive data streams 101, 201 is lost, activity detection unit 314 sends a corresponding selection signal 319 to changeover unit 313. Changeover unit 313 is now immediately enabled, i.e., without a settling time, to change over to one or the other receive data stream if one receive data stream is lost. The two receive data streams 101 and 201 are synchronized to one another by delay unit 308, making it possible to supply a corresponding control signal 318 to clock recovery unit 301 for synchronization with a data stream without a time delay.

Accordingly a phase locked loop of clock recovery unit 301 also continues to operate if a receive data stream is lost, without the necessity of a corresponding settling time (settling period).

Figure 2:
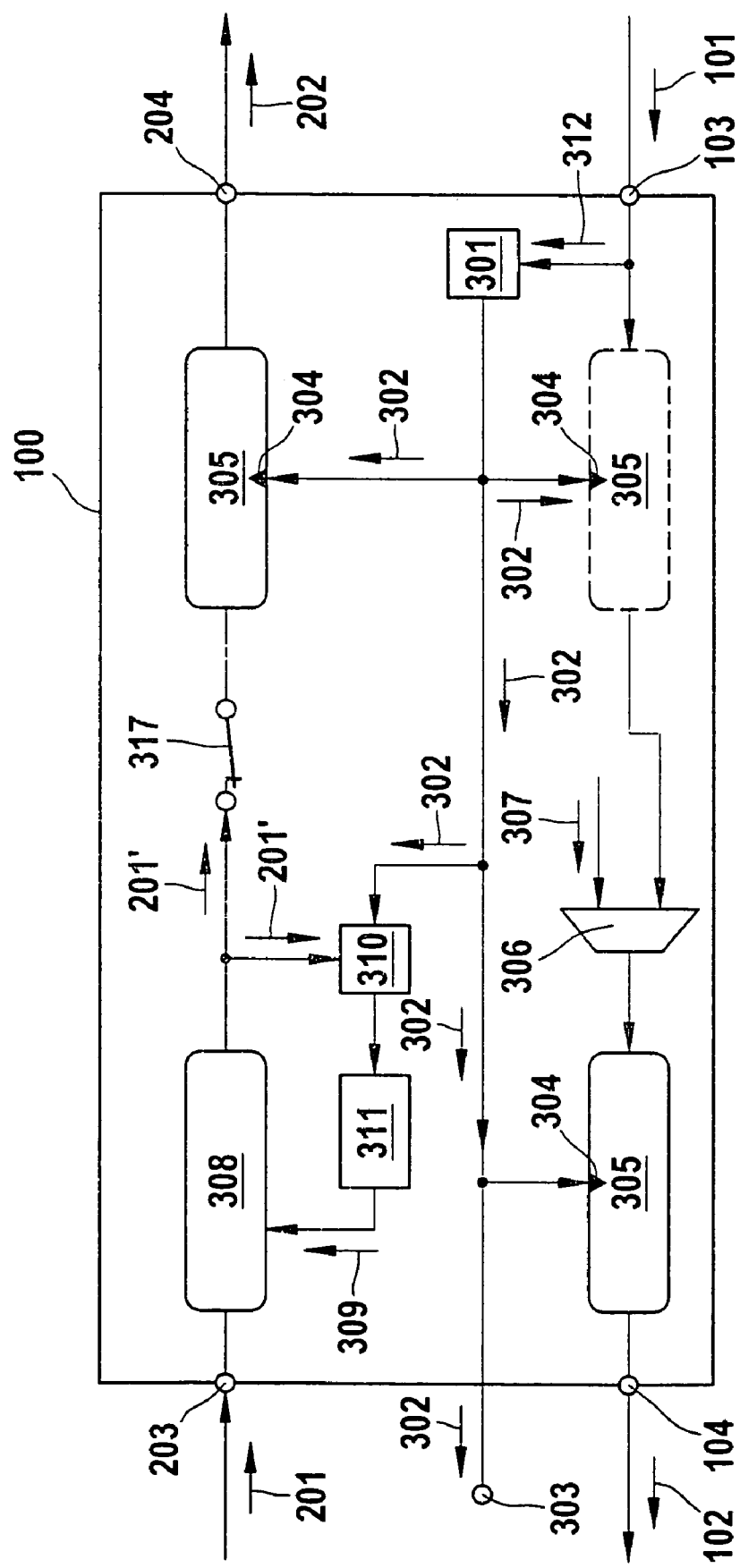
FIG. 2 shows a detailed block diagram of the data processing device according to a preferred exemplary embodiment of the present invention, the operation of the data processing device in a calibration mode being illustrated.

FIG. 2 shows the data processing device illustrated in FIG. 1 in a calibration mode. As described above with reference to FIG. 1, in calibration mode, delay value 309 is determined, which must be supplied to delay unit 308 for delaying the at least one second receive data stream 201. As illustrated in FIG. 2, first receive data stream 101 is supplied via first receive data input unit 103 to a synchronization unit 305 which receives clock signal 302 via its clock signal input 304. It should be pointed out that this synchronization unit 305 may be provided optionally.

Subsequently, already synchronized first receive data stream 101 is supplied to a multiplexing unit 306, which makes it possible for both first receive data stream 101 and a first internal data stream 307 to be forwarded to a second synchronization unit 305, which also receives clock signal 302 via its corresponding clock signal input 304. Finally, first receive data stream 101 is output as a first transmit data stream 102 from second synchronization unit 305 via first transmit data output unit 104. Clock recovery unit 301 receives a synchronization signal 312 which is derived from the first receive data stream.

In the following, a phase shift is determined between first receive data stream 201 and first receive data stream 101. To this end, clock signal 302 provided by clock recovery unit 301 is supplied to a determination unit 310. Furthermore, second receive data stream 201' which is delayed by delay unit 308 (described above with reference to FIG. 1) is supplied to determination unit 310.

Determination unit 310 now determines a time delay between clock signal 302 and second, delayed receive data stream 201' and sets a delay value 309, which is supplied to delay unit 308 in such a way that a time delay between clock signal 302 and delayed second receive data stream 201' becomes zero. In this calibration mode, delay value 309 is measured for an extended period of time and a check is made whether the delay value for delaying second receive data stream 201 remains stable in order to obtain delayed second receive data stream 201'. If delay value 309 no longer changes for an extended period of time, this delay value 309 is stored in a memory unit 311, thus making it possible to use this delay value 309 for delaying supplied second receive data stream 201 at any point in time. It should be pointed out that different delay values 309 may be stored in memory unit 311 depending on the application. During the calibration phase, a calibration switching unit 317 is switched in such a way that second receive data stream 201 is supplied unchanged to second transmit data output unit 204 via a synchronization unit 305 to which clock signal 302 is supplied via its clock signal input 304.

The calibration mode, which is provided by the preferred exemplary embodiment of the present invention, thus makes it possible to tune first and second receive data streams 101 and 201, respectively, routed through a data processing device 100 to each other in such a way that it is possible to provide synchronization of a clock recovery unit by each of data streams 101, 201 supplied to data processing device 100. In particular, it is possible to use changeover unit 313 described above with reference to FIG. 1 to change over the synchronization between the two receive data streams 101, 201 without the necessity of a settling period. This makes it possible to recover the clock rate from one of the two receive data streams 101, 201 quickly and efficiently.

Figure 3:
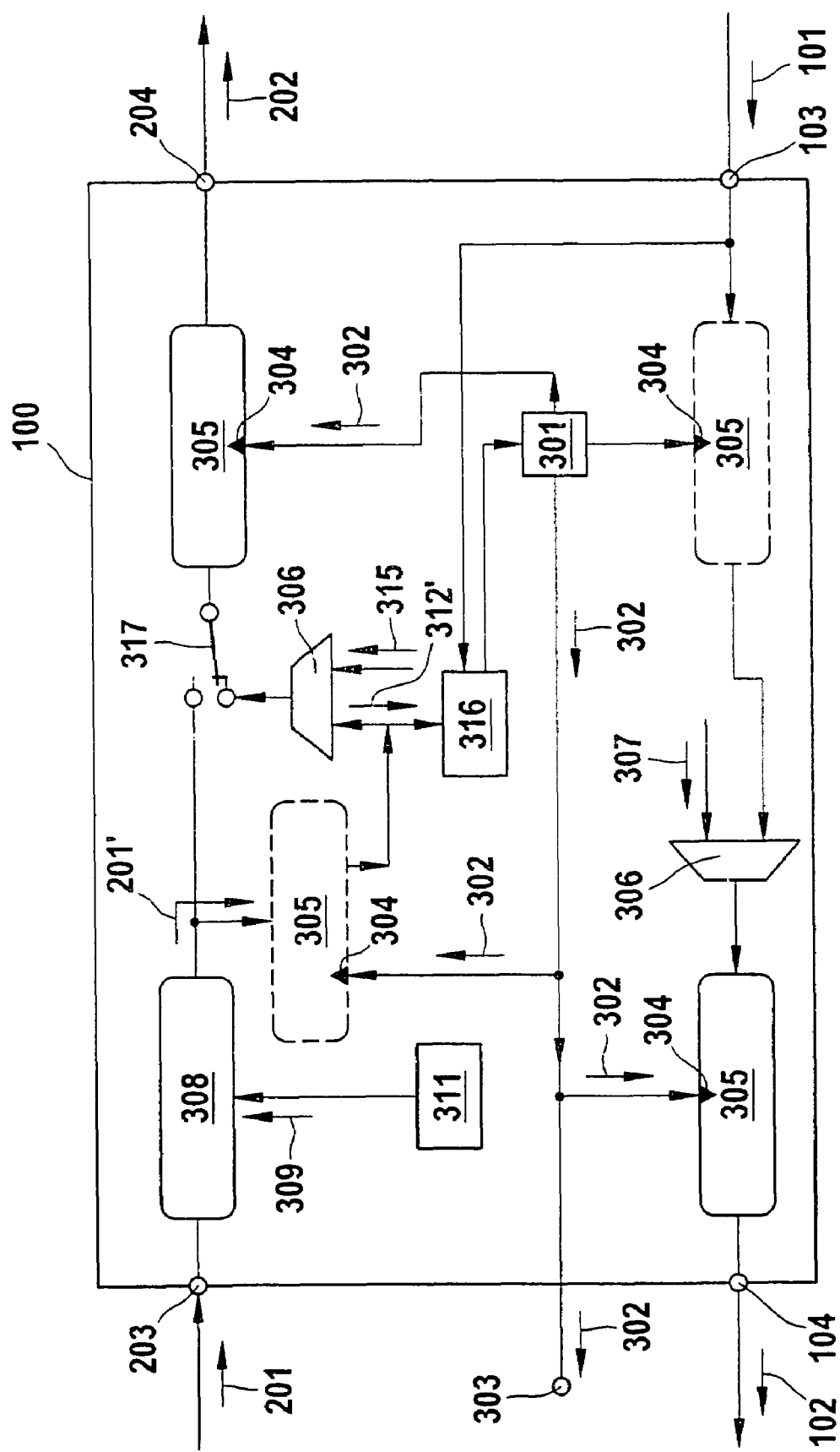
FIG. 3 shows a detailed block diagram of the data processing device according to a preferred exemplary embodiment of the present invention, an operation of the data processing device in a normal mode, i.e., in a working phase, being illustrated.

FIG. 3 shows data processing device 100 according to the present invention in an overview block diagram. As shown in FIG. 3, delayed second receive data stream 201' is no longer supplied to second transmit data output unit 204 via synchronization unit 305.

It should be pointed out that in the figures, identical reference numerals denote components or steps that are identical or have an identical function so that components or steps already described in FIG. 3 are omitted from the explanation to avoid an overlapping description.

In FIG. 3, calibration switching unit 317 is switched to a normal mode in such a way that second receive data stream 201 is delayed by a fixed delay value 309 by delay unit 308. This delayed second receive data stream 201' is synchronized via a synchronization unit 305 to which clock signal 302 is supplied via a clock signal input 304. It should be pointed out that this first synchronization unit 305 in the signal path of second receive data stream 201, 201' is optional.

In a similar manner, as described above with reference to FIG. 2 for first receive data stream 101, delayed second received data stream 201' is also supplied to a multiplexing unit 306, which provides the possibility of outputting a second internal data stream 315 or delayed second receive data stream 201' to a second synchronization unit 305 to which clock signal 302 is supplied via an assigned clock signal input 304 to second transmit data output unit 204.

Control unit 316 of the present invention, including changeover unit 313 (see FIG. 1), now makes it possible to supply either synchronization information (synchronization signal 312), which is derived from first receive data stream 101, or a synchronization signal 312', which is derived from delayed second received data stream 201', to clock recovery unit 301. If one of the two receive data streams 101 or 201 is lost, control unit 316 makes a rapid changeover possible between the synchronization information that is supplied from first receive data stream 101 and the synchronization information that is supplied from second receive data stream 201.

According to the preferred exemplary embodiment of the present invention, in a network having a plurality of receive data streams of the same basic frequency, a receive data stream is first selected to which the phase locked loop of a clock recovery unit 301 is synchronized. This receive data stream is referred to as a reference data stream. After the phase locked loop of clock recovery unit 301 has achieved steady state, i.e., when a lock signal has been received and the data of the data stream has been determined to be free from errors, the data of the at least one second receive data stream 201 is received and analyzed. It is determined if the data is free from errors, for example using a code, a frame structure and the number of bytes per frame.

Based on the phase shift present between the two receive data streams, it is possible that the data received from the at least one second receive data stream 201 may not be free from error. The data of second receive data stream 201 is now delayed using delay unit 308 starting from a fixed initial value in such a way that the phase positions of the two receive data streams are adjusted until it is possible to receive the data of second receive data stream 201 including the clock rate generated from the reference data stream reliably and free from error.

In calibration mode (described above with reference to FIG. 2), a network-dependent delay of this type is determined. During the calibration mode, the data of the second receive data stream is forwarded unchanged to second transmit data output unit 204, i.e., a downstream node using calibration switching unit 317. Before first or second receive data streams 101, 201 are output as transmit data streams 102, 202 via the corresponding output units, a synchronization in each of synchronization units 305, each of which is switched by clock signal 302, causes the phase position to remain unchanged even after calibration switching unit 317 is opened, i.e., after a switch to a normal mode. For this reason, it is possible to calibrate all nodes simultaneously in the case of data processing devices connected in series. Accordingly, all nodes simultaneously change to a working mode. The information for the changeover is transferred via the reference data stream as status information or control information.

In order to implement a variable delay by delay element 308, it is constructed, for example, from a variable number of inverters.

Alternatively, it is possible to measure the phase shift between the two receive data streams directly and eliminate it via the delay element. It is possible to implement a direct measurement through conventional measures known to the person skilled in the art by, for example, one edge of the reference data stream starting the measuring unit and one edge of second receive data stream 201 switching the measuring unit off. The measuring unit thus generates a voltage that increases proportionally to a time difference (phase difference) between the two receive data streams 101, 201. Using a voltage of this type, it is possible to activate or switch delay element 308, the delay value being specified as a function of voltage. As soon as data is also received from second receive data stream 201 in a stable condition in calibration mode for a definable extended period of time, the calibration value, i.e., delay value 309 for delay unit 308 is stored. It is possible to store or specify the number of linked inverters in a register in a simple manner. In the alternative case, the voltage value for the delay element must be stored. It is possible to implement this by providing a digital representation of this voltage value in a register and providing a digital-to-analog converter to generate the analog voltage value necessary for delay unit 308.

Delay value 309 stored in memory unit 311 retains its validity until the system is again switched into a calibration mode by calibration switching unit 317. This is necessary, for example, if the delay conditions in the network into which data processing device 100 is integrated change. Changes of this type may result, for example, from switching users (i.e., data processing devices) on or off, reconfigurations and due to errors.

It is further possible that phase locked loop PLL provided in clock recovery unit 301 receives edge information from both receive data streams 101 and 201 in the working phase, i.e., in the normal mode. Based on the set delay, reception of the edge information is now isochronous. As long as the reference data stream is received without error, only the edge information of this node is analyzed initially.

If the reference data stream is lost by, for example, activity detection unit 314 which is provided in control unit 316 (see FIG. 1), or through codes, or the frame structure is detected, the phase locked loop switches to the edge detection of second receive data stream 201. Because in addition to the equality of the frequency, the processing method of the present invention now also provides a phase equality of the two receive data streams 101, 201, no settling time or settling period is necessary for the phase locked loop of clock recovery unit 301. Advantageously, clock signal 302 is preserved unchanged when a synchronization is switched over from first receive data stream 101 (reference data stream) to the at least one second received data stream 201 without interference.

Although the present invention was described on the basis of preferred exemplary embodiments, it is not limited to them but instead may be modified in various ways.

The present invention is also not limited to the possible applications cited.

LIST OF REFERENCE NUMERALS

Identical reference numerals in the figures denote identical components or steps or components having an identical function.

| | |
|---|---|
| 100 | Data processing device |
| 101 | First receive data stream |
| 102 | First transmit data stream |
| 103 | First receive data input unit |
| 104 | First transmit data output unit |
| 201 | Second receive data stream |
| 201' | Delayed second receive data stream |
| 202 | Second transmit data stream |
| 203 | Second receive data input unit |
| 204 | Second transmit data output unit |
| 301 | Clock recovery unit |
| 302 | Clock signal |
| 303 | Clock signal output |
| 304 | Clock signal input |
| 305 | Synchronization unit |
| 306 | Multiplexing unit |
| 307 | First internal data stream |
| 308 | Delay unit |
| 309 | Delay value |
| 310 | Determination unit |
| 311 | Memory unit |
| 312, 312' | Synchronization signal |
| 313 | Changeover unit |
| 314 | Activity detection unit |
| 315 | Second internal data stream |
| 316 | Control unit |
| 317 | Calibration switching unit |
| 318 | Control signal |
| 319 | Selection signal |

What is claimed is:

1. A data processing system, comprising:
a first data processing device, including:
 a) a first receive data input unit for inputting a first receive data stream into the data processing device;
 b) at least one second receive data input unit for inputting at least one second receive data stream into the data processing device;
 c) a clock recovery unit for recovering a first clock signal from at least one of the first receive data stream and the at least one second receive data stream;
 d) a control unit for controlling the clock recovery unit as a function of one of the first receive data stream and the at least one second receive data stream; and
 e) a first delay unit for delaying the at least one second receive data stream with respect to the first receive data stream in such a way that the first receive data stream is synchronized with the at least one second receive data stream; and
a second data processing device connected in series with the first data processing device and including:
 a) a third receive data input unit for inputting a third receive data stream into the data processing device;
 b) at least one fourth receive data input unit for inputting at least one fourth receive data stream into the data processing device; and c) a second clock recovery unit for recovering a second clock signal from at least one of the third receive data stream and the at least one fourth receive data stream;

d) a second control unit for controlling the second clock recovery unit as a function of one of the third receive data stream and the at least one fourth receive data stream; and e) a second delay unit for delaying the at least one fourth receive data stream with respect to the third receive data stream in such a way that the third receive data stream is synchronized with the at least one fourth receive data stream.

2. The system as recited in claim 1, wherein the clock recovery units include phase locked loops (PLL).

3. The system as recited in claim 1, wherein:
the first data processing device further includes f) an arrangement for determining a time shift between the first receive data stream and the at least one second receive data stream.

4. The system as recited in claim 1, wherein the first data processing device further includes g) a memory unit for storing at least one delay value, the at least one second receive data stream being delayed corresponding to the at least one delay value.

5. The system as recited in claim 3, wherein the first data processing device further includes g) a calibration switching unit, the switching unit being used to switch from a normal mode in which the first clock signal is recovered from one of the first receive data stream and the at least one second receive data stream into a calibration mode in which at least one delay value is determined for the at least one second receive data stream using the determination arrangement.

6. The system as recited in claim 1, wherein the first delay unit provides a variable delay of the at least one second receive data stream with respect to the first receive data stream and includes a variable number of inverter units connected in series.

7. A method for data processing including clock recovery in a data processing system, comprising:
a1) inputting a first receive data stream into a first data processing device using a first receive data input unit included in the first data processing device;

b1) inputting at least one second receive data stream into the first data processing device using at least one second receive data input unit included in the first data processing device;

c1) recovering a first clock signal from at least one of the first receive data stream and the at least one second receive data stream using a first clock recovery unit included in the first data processing device;

d1) controlling the first clock recovery unit as a function of one of the first receive data stream and the at least one second receive data stream using a first control unit included in the first data processing device;

e1) delaying the at least one second receive data stream with respect to the first receive data stream using a first delay unit included in the first data processing device in such a way that the first receive data stream is synchronized with the at least one second receive data stream;

a2) inputting a third receive data stream into a second data processing device using a third receive data input unit included in the second data processing device;

b2) inputting at least one fourth receive data stream into the second data processing device using at least one fourth receive data input unit included in the second data processing device;

c2) recovering a second clock signal from at least one of the third receive data stream and the at least one fourth receive data stream using a second clock recovery unit included in the second data processing device;

d2) controlling the second clock recovery unit as a function of one of the third receive data stream and the at least one fourth receive data stream using a second control unit included in the second data processing device; and e2) delaying the at least one fourth receive data stream with respect to the third receive data stream using a second delay unit included in the second data processing device in such a way that the third receive data stream is synchronized with the at least one fourth receive data stream;

wherein the second processing device is connected in series with the first processing device.

8. The method as recited in claim 7, wherein phases of the recovered clock signals are regulated using phase locked loops (PLL) provided in the clock recovery units.

9. The method as recited in claim 7, wherein a time shift between the first receive data stream and the at least one second receive data stream is determined using a determination unit.

10. The method as recited in claim 7, wherein at least one delay value is stored in a memory unit, the at least one second receive data stream being delayed according to the stored delay value.

11. The method as recited in claim 9, wherein a calibration switching unit is used to switch between a normal mode in which the first clock signal is recovered from one of the first receive data stream and the at least one second receive data stream into a calibration mode in which a delay value is determined for the at least one second receive data stream using the determination unit.

12. The method as recited in claim 7, wherein the first delay unit is used to provide a variable delay of the at least one second receive data stream with respect to the first receive data stream, a variable number of inverter units connected in series included in the first delay unit.

13. The method as recited in claim 7, wherein a generated clock signal is synchronized alternately with the first receive data stream and the at least one second receive data stream.

14. The method as recited in claim 7, wherein a first transmit data stream is provided at a first transmit data output unit of the first data processing device as a function of the first receive data stream.

15. The method as recited in claim 14, wherein a second transmit data stream is provided at a second transmit data output unit of the first data processing device as a function of the second receive data stream.

16. The method as recited in claim 15, wherein the second receive data stream and the second transmit data stream are provided a plurality of times.

17. The method as recited in claim 7, wherein the first receive data stream is provided as a reference data stream for the at least one second receive data stream.

18. The method as recited in claim 16, wherein in a calibration mode, the received second receive data stream is forwarded unchanged to a second transmit data output unit of the first data processing device for output as a second transmit data stream.

* * * * *